United States Patent [19]
Mitchell et al.

[11] Patent Number: 5,900,437
[45] Date of Patent: May 4, 1999

[54] HYDROPHILIC/OLEOPHILIC MICROCELLULAR FOAM AND METHOD FOR MAKING SAME

[75] Inventors: Michael A. Mitchell, Lake Zurich; Anthony S. Tomlin, Island Lake, both of Ill.

[73] Assignee: AMCOL International Corporation, Arlington Heights, Ill.

[21] Appl. No.: 08/867,328

[22] Filed: Jun. 2, 1997

[51] Int. Cl.$^6$ ...................................... C08J 9/28
[52] U.S. Cl. ................ 521/64; 521/62; 521/63; 604/369
[58] Field of Search .................. 521/62, 63, 64, 521/65; 604/369

[56] References Cited

U.S. PATENT DOCUMENTS

| | | | |
|---|---|---|---|
| 4,446,051 | 5/1984 | Berthod et al. | 252/309 |
| 4,536,521 | 8/1985 | Haq | 521/146 |
| 4,606,913 | 8/1986 | Aronson et al. | 424/59 |
| 4,606,958 | 8/1986 | Haq et al. | 428/68 |
| 4,659,567 | 4/1987 | Cox et al. | 424/65 |
| 4,797,310 | 1/1989 | Barby et al. | 428/71 |
| 5,066,784 | 11/1991 | Sherrington et al. | 530/334 |
| 5,189,070 | 2/1993 | Brownscombe et al. | 521/64 |
| 5,200,433 | 4/1993 | Beshouri | 521/64 |
| 5,210,104 | 5/1993 | Bass et al. | 521/64 |
| 5,252,619 | 10/1993 | Brownscombe et al. | 521/64 |
| 5,292,777 | 3/1994 | DesMarais et al. | 521/64 |
| 5,306,734 | 4/1994 | Bass et al. | 521/63 |
| 5,331,015 | 7/1994 | DesMarais et al. | 521/62 |
| 5,340,842 | 8/1994 | Adamski et al. | 521/64 |
| 5,358,974 | 10/1994 | Brownscombe et al. | 521/64 |
| 5,362,762 | 11/1994 | Beshouri | 521/64 |
| 5,387,207 | 2/1995 | Dyer et al. | 604/369 |
| 5,394,738 | 3/1995 | Bass et al. | 73/54.06 |
| 5,500,451 | 3/1996 | Goldman et al. | 521/64 |

FOREIGN PATENT DOCUMENTS

| | | | |
|---|---|---|---|
| 0 110 678 | 6/1984 | European Pat. Off. | C08K 7/00 |
| WO 96/21505 | 7/1996 | WIPO | B01F 13/10 |

*Primary Examiner*—Morton Foelak
*Attorney, Agent, or Firm*—Marshall, O'Toole, Gerstein, Murray & Borun

[57] ABSTRACT

A superabsorbent foam material is made by a water-in-oil high internal phase emulsion polymerization comprising the steps of (a) dissolving an organic solvent-soluble surfactant in a water-insoluble monomer to form an organic phase; (b) blending the organic phase with an aqueous phase using high shear mixing to form an emulsion, said aqueous phase comprising a water-soluble polymer, a cross-linking agent, and water; (c) polymerizing the water-insoluble monomer in the organic phase; (d) cross-linking the water-soluble polymer in the aqueous phase; and (e) final curing and drying the resulting foam.

12 Claims, No Drawings

HYDROPHILIC/OLEOPHILIC MICROCELLULAR FOAM AND METHOD FOR MAKING SAME

BACKGROUND OF THE INVENTION

1. Field of the Invention

This invention relates to a process of preparing a microcellular foam by a high internal phase emulsion (HIPE) polymerization process and, more particularly, to a HIPE polymerization process for preparing a hydrophilic/oleophilic foam including polymerizing a water-insoluble monomer in a continuous organic phase, and polymerizing one or more water-soluble monomers and/or cross-linking a water-soluble polymer in an internal aqueous phase.

2. Brief Description of Related Technology

Foams are used as absorbent material, insulation, light weight structural articles, cushions and impact (or shock) absorbers. Hydrophilic microcellular foams prepared by HIPE polymerization have been of particular use as absorption media in a host of applications ranging from personal care, such as diaper and adult incontinence devices, to general fluid absorption for spills.

An emulsion is a dispersion of one liquid phase in another, immiscible, liquid phase. Among the many emulsions are oil-in-water and water-in-oil. In an oil-in-water emulsion, an oil phase is dispersed in an aqueous phase, while in a water-in oil emulsion a water phase is dispersed in an oil phase.

In general, essential ingredients in an emulsion polymerization include water, a water-insoluble monomer, an oil-in-water emulsifier capable of suspending oil (organic) droplets in a water (aqueous) phase, and a polymerization initiator, such as a free radical initiator compound (or compounds) which releases free radicals capable of initiating polymerization. HIPE polymerization processes typically include, in addition to the ingredients listed above, a water-insoluble comonomer, and a water-soluble electrolyte for the purpose of preventing the water-insoluble monomer and comonomer from dissolving or dispersing in the aqueous phase.

HIPE polymerization processes have proven to be an excellent method of preparing low density foams for use as absorption media, and are described, for example, in U.S. Pat. No. 5,387,207 to Dryer et al. and U.S. Pat. No. 5,331,015 to DesMarais et al. However, such known HIPE polymerization processes disclosed in these patents and other prior art yield materials with large, closed cells which do not contribute to absorption, or must be post-polymerization surface-treated to provide the polymer with hydrophilicity. Furthermore, none of these patents or other prior art disclose polymerizing a monomer or cross-linking a polymer or monomer in an internal aqueous phase.

Notwithstanding these known methods of HIPE polymerization, there is a continuing need to optimize the absorption capacity of low density foams. However, at the same time, there is a continuing need to maintain or even improve other desirable characteristics of these low density foams, such as a capability to absorb both water and oil (hydrophilic and oleophilic properties), structural integrity, and a desirable softness to touch. More absorbent foams would satisfy existing consumer demands for a better product.

It would be desirable to provide a process for making such low density absorbent foams by a HIPE polymerization process where it is possible to minimize the yield of large, closed cells.

SUMMARY OF THE INVENTION

It is an object of this invention to overcome one or more of the problems described above.

In one aspect, this invention is directed to a method of manufacturing a foam material wherein the foam material is polymerized from a water-in-organic (oil) emulsion, which emulsion, prior to polymerization, comprises an organic phase; and a water phase that includes water and a water-soluble polymer.

In another aspect, this invention is directed to a method of manufacturing a hydrophilic/oleophilic foam material wherein the foam material is polymerized from a water-in-organic (oil) emulsion, which emulsion, prior to polymerization, comprises an organic phase; and a water phase that includes water and a water-soluble polymer.

In another aspect, this invention is directed to a process for preparing a superabsorbent hydrophilic/oleophilic microcellular foam by a high internal phase emulsion (HIPE) polymerization process comprising the steps of (a) forming an organic phase by dissolving an organic solvent-soluble surfactant in a water-insoluble (organic-soluble) monomer, or in a mixture of water-insoluble (organic-soluble) monomers; (b) blending the organic phase with an aqueous phase using high shear mixing to create the HIPE, wherein the aqueous phase includes water and a water-soluble polymer; (c) polymerizing the water-insoluble monomers in the organic phase; and (d) final curing and drying the resulting polymer foam.

In accordance with the process of the present invention, it is possible to achieve a foam density between about 18 milligrams per cubic centimeter (mg/cc) and about 25 mg/cc. Furthermore, using this process, it is possible to achieve such a low density foam that can imbibe at least about 30 grams of fluid (aqueous and/or organic) per gram of foamed polymer and, more preferably, between about 30 and about 60 grams of fluid (aqueous and/or organic) per gram of foamed polymer.

DETAILED DESCRIPTION OF THE INVENTION

In the process of this invention, a superabsorbent microcellular foam is prepared by a high internal phase emulsion (HIPE) polymerization process comprising the steps of (a) forming an organic phase by dissolving an organic solvent-soluble surfactant in a water-insoluble (organic-soluble) monomer, or in a mixture of water-insoluble (organic-soluble) monomers; (b) blending the organic phase with an aqueous phase using high shear mixing to create the HIPE, wherein the aqueous phase includes water and a water-soluble polymer; (c) polymerizing the water-insoluble monomer(s) in the organic phase; and (d) final curing and drying the resulting polymer foam.

The foamed polymer product formed by the HIPE process of this invention is characterized by a structure that comprises a high internal phase water-in-oil emulsion, which emulsion, prior to polymerization, comprises an organic phase; and a water phase that includes water, a water-soluble polymer, and a polymerization initiator.

The organic phase includes one or more organic water-insoluble (solvent-soluble) monomers and, preferably includes an organic solvent-soluble surfactant. Preferred organic solvent-soluble surfactants include sorbitan monooleate (e.g., SPAN® 80 manufactured by ICI Chemicals) and sorbitan trioleate (e.g., SPAN® 85 manufactured by ICI Chemicals). Suitable monomers include styrene, divinyl benzene, 2-ethylhexyl acrylate, isoprene, hexanediol, diacrylate, and/or polybutadiene. The organic phase optimally includes about 20% to about 30% by weight organic solvent-soluble surfactant, and about 80% to about 70% by weight organic solvent-soluble monomer(s). Preferably the organic phase includes about 25% by weight organic solvent-soluble surfactant and about 75% by weight organic solvent-soluble monomer(s). For example, an organic phase may include 25% sorbitan monooleate, 37.5% styrene, and 37.5% divinyl benzene.

Organophilic (organic modified) clays, such as dodecylpyrrolidone montmorrillonite, and the like may be added to the organic phase. Furthermore, an organophilic, e.g., guaternary ammonium-reacted montmorrillonite clay also can be added to the organic phase to modify physical properties of the foam (i.e, strength, modulus).

It is preferable that the components comprising the organic phase are of a type such that the resulting polymeric foam is suitably non-toxic and chemically stable, thereby ensuring safe operation of the foam when in close proximity to food, drugs, and human skin. These components should preferably have little to no toxicity when used in close proximity to food, drugs, and human skin.

The aqueous phase includes water, a water-soluble polymer, and optionally a cross-linking agent, and a polymerization initiator.

Suitable water-soluble polymers include water-absorbent polymers, such as polyacrylic acid; partially neutralized (5 to 95 mole percent neutralized) polyacrylic acid; carboxymethylcellulose; hydroxyethyl cellulose; polyacrylamide; polyethylenimine; metal salts of polyethylenimine; poly (epichlorohydrin-alt-dimethylamine); copolymers of polyacrylamide, and acrylic acid; copolymers of poly (methyl vinyl ether) and maleic acid; poly(N-vinylpyrrolidone); starch; starch derivatives; and starch grafted sodium polyacrylate.

The water-soluble polymer is preferably included in the aqueous phase in an amount in the range of about 0.01 wt. % to about 1.0 wt. % based on the weight of the aqueous phase. If the amount of water-soluble polymer is in excess of about 1.0 wt. % based on the weight of the aqueous phase, then the resulting polymer might shrink, resulting in higher density foams and foams having lower absorption volumes. While any molecular weight water-soluble polymers may be used, it is preferred to use relatively low- to moderate-molecular weight water-soluble polymers, e.g., polyacrylic acid having a weight average molecular weight of about 2,000 to about 1,000,000, preferably about 10,000 to about 300,000.

When used, the cross-linking agent is included in an amount less than about 1 wt. %, and typically about 0.001wt. % to about 0.005 wt. % based on the total weight of the aqueous phase. Suitable cross-linking agents for the water-soluble polymer include water-soluble diepoxides (e.g., ethylene glycol diglycidyl ether), multifunctional aziridines, epicholorohydrin, 1,3-dichloro-2-propanol, polyquarternary amine salts such as POLYCUP® resins manufactured by Hercules Inc., Wilmington Del., propylene glycol, propylene carbonate, and salts of aluminum and zinc.

When used, cross-linking agents render the water-soluble polymer more water insoluble, and therefore more difficult to extract from the formed foam product. Cross-linking agents should not be used in situations where it is desired to extract the polymer from the foam, where the water-soluble polymer (e.g., polyacrylamide or poly(N-vinylpyrrolidone) is not easily cross-linked, or where the use of the foam does not require immobilization. In most other cases, however a cross-linking agent may be used. For example, polymers containing sodium or potassium acrylate groups may readily be cross-linked by a reaction with diepoxides, multifunctional aziridines, dihalides, epichlorohydrin, polyols, and aluminum or zinc salts. Polyamines, such as polyethylenimine and polyvinylamine, can be cross-linked with diepoxides, multifunctional aziridines, dihalides, epichlorohydrin, and diacids or diesters.

The aqueous phase of the HIPE polymerization process of the present invention may also contains a polymerization initiator, such as a free radical initiator component. However, polymerization and cross-linking of the water-soluble monomer(s) in the aqueous phase can be accomplished without a polymerization initiator, for example, via exposing the emulsion to ultraviolet radiation or other polymerization techniques known to those skilled in the art. Suitable free radical initiators for use with polyanion water-soluble polymers (e.g., poly(sodium acrylate)) include peroxygen compounds such as sodium, potassium, and ammonium persulfates, and 4,4'-azobis(4-cyanopentanoic acid). Suitable free radical initiators for use with polycation water-soluble polymers (e.g., polyethylenimine hydrochloride) include 2,2'-azobis[2-(2-imidazolin-2-yl)propane] dihydrochloride which is commercially available as VA-044 from Wako Chemicals Inc., Richmond, Va, and 2,2'-azobis (2-amidinopropane)dihydrochloride which is commercially available as V-50 from Wako Chemicals Inc., Richmond, Va. Suitable initiators for use with either a polycation or polyanion water-soluble polymer include 2,2'-azobis{2-methyl-N-[1,1-bis(hydroxymethyl)-2-hydroxyethyl] propionamide}, 2,2'-azobis{2-methyl-N-[1,1-bis (hydroxymethyl)ethyl]propionamide}, 2,2'-azobis[2-methyl-N-(2-hydroxyethyl) propionamide], 2,2'-azobis (isobutyramide)dihydrate. When used, the free radical initiator comprises about 0.1 wt. % to about 0.3 wt. % based on the weight of the aqueous phase.

Additionally, other expedients may be added to the aqueous phase in an amount less than about 5 wt. %, preferably in an amount less than 2 wt. %, and more preferably in an amount less than about 1 wt. %. Expedients that may be added include water-soluble surfactants or exfoliated sodium bentonite, such as those disclosed in U.S. Pat. No. 4,446,051. A water-soluble surfactant, such as POLYSORBATE 80, can help increase the aqueous solution wetting rate of the hydrophilic polymer resulting from polymerization in the aqueous phase.

Generally, water is present in the aqueous phase in an amount in the range of about 93 wt. % to about 99.99 wt. %. When the aqueous phase consists of only the water-soluble polymer and water, the aqueous phase comprises about 99.0 wt. % to about 99.99 wt. % water. When a cross-linking agent is present, however, water is present in an amount in the range of about 98.995 wt. % to about 99.989 wt. %. On the other hand, when a polymerization initiator is present, water is present in an amount in the range of about 98.7 wt. % to about 99.89 wt. %.

The aqueous phase is blended with the organic phase by high shear mixing (e.g., with a blade operating at 1000 rotations per minute) to form the HIPE. The high shear mixing occurs for about 2 to about 5 minutes, preferably about 5 minutes. The HIPE is a thixotropic fluid having a low fluid viscosity at high shear mixing. Air is easily trapped in the HIPE because of the thixotropic nature of the emulsion. Thus, the HIPE is mixed after its formation at higher speeds for another five to ten minutes to ensure the presence of air in the HIPE which is useful in lowering the bulk density of the foam, thereby increasing the absorption volume. Absorption volume is inversely proportional to the density of the foam. Thus, a lower foam density is essential for maximum absorbency.

In accordance with one embodiment of the present invention, superabsorbent polymer (SAP) in the form of granules (e.g., SAP fines) or fibers (e.g., SAP fibers) can be incorporated into the foams of the present invention in a post-mixing, pre-curing step.

The foamed polymers are dried in an oven, for example, at about 50° C. to about 80° C., preferably about 60° C. for about 8 hours to about 20 hours, preferably for about 16 hours. The resulting foam takes the shape of its container. When curing is complete, the foam is then dried in an oven, for example, at about 50° C. to about 100° C., preferably about 80° C. for about 10 hours to about 2 days, preferably about 16 hours.

The formed superabsorbent polymer product has a foam density of about 18 mg/cc to about 25 mg/cc and is capable of absorbing up to about 60 grams of fluid (aqueous and/or organic) per gram of foamed polymer.

EXAMPLES

The following examples are provided to illustrate the invention but are not intended to limit the scope thereof. All parts and percentages are by weight unless otherwise indicated.

Determination of Foam Density and Absorption

Gram for gram absorbency under load (AUL) is measured by first cutting a foam sample into a disk having a diameter of 2.5 cm and a height of 1 to 1.5 cm. The foam disk is then weighed ($M_{initial}$) and placed in a dish of 0.5 cm deep 1% aqueous saline solution. A 0.7 psi load is applied on the foam disk by placing a 250 g steel cylinder, having a diameter of 2.5 cm, on the foam disk. Alternatively, the foam can be allowed to absorb water with no applied load (gram for gram absorbency under no load, AUNL). After one hour, the load is removed, and the foam disk is placed in a dry dish for two minutes and then removed from the dish and weighed. The foam then is weighed twice more and a final weight ($M_{final}$) is determined as the average of the three measured weights. The gram for gram absorbency under load (AUL) is the sum of the final weight ($M_{final}$) minus the initial weight ($M_{initial}$) which then is divided by the initial weight ($M_{initial}$):

$$AUL(g/g)=(M_{final}-M_{initial})/M_{initial}$$

The volume of the foam disk is calculated from the measured dimensions. The density then is determined by dividing the initial mass ($M_{initial}$) by the calculated volume.

Example 1

This example illustrates the preparation of a preferred absorbent foam material by the claimed HIPE polymerization process. The resulting foam has a bulk density of 18 mg/cc and a gram for gram absorption capacity under load (AUL at 0.7 psi) of 54 grams of solution (aqueous and/or organic) per gram of foam.

To an organic solution comprising 1.55 parts sorbitan monooleate, 2.33 parts styrene, and 2.33 parts divinyl benzene, is added an aqueous solution comprising 245 parts water, 1.7 parts polyacrylic acid solution (30% solids, MW=170,000, and 75 mole percent neutralized to the sodium salt), 0.5 parts potassium persulfate polymerization initiator, and 0.05 parts of a 1% ethylene glycol diglycidyl ether cross-linking agent solution.

The aqueous solution is added to the organic solution at a rate of approximately 10 milliliters per minute (ml/min) while stirring with a high shear mixing blade at 1000 rotations per minute (rpm). After the addition of the aqueous solution is complete, stirring by high shear mixing continues at a rate of 2000 rpm for 5 minutes to introduce air into the thixotropic mixture, and to ensure complete mixing and small pore size.

The emulsion then is poured into a mold and cured at 60° C. for 16 hours. The resulting foam is obtained by removing the cured emulsion from its mold and drying it to a constant weight by heating it at 8° C. in a convection oven. The resulting foam has a density of 18 mg/cc and can imbibe 54 grams of fluid for each gram of foam.

Example 2

This example illustrates the preparation of a preferred absorbent foam material by the claimed HIPE polymerization process. The resulting foam has a bulk density of 23 mg/cc and a gram for gram absorption capacity under load (AUL @ 0.7 psi) of 44 grams of solution (aqueous and/or organic) per gram of foam.

To an organic solution comprising 1.55 parts sorbitan monooleate, 2.33 parts styrene, and 2.33 parts divinyl benzene, is added an aqueous solution comprising 245 parts water, 1.7 parts polyacrylic acid solution (30% solids, MW=170,000, and 75 mole percent neutralized to the sodium salt), 0.5 parts potassium persulfate polymerization initiator, and 0.05 parts polysorbate 80, and 0.05 parts of a 1% ethylene glycol diglycidyl ether cross-linking agent solution.

The aqueous solution is added to the organic solution at a rate of approximately 10 ml/min while stirring with a high shear mixing blade at 1000 rpm. After the addition of the aqueous solution is complete, stirring by high shear mixing continues at a rate of 2000 rpm for 5 minutes to introduce air into the thixotropic mixture, and to ensure complete mixing and small pore size.

The emulsion then is poured into a mold and cured at 60° C. for 16 hours. The resulting foam is obtained by removing the cured emulsion from its mold and drying it to a constant weight by heating it at 80° C. in a convection oven. The resulting foam has a density of 23 mg/cc and can imbibe 44 grams of fluid (aqueous and/or organic) for each gram of foam.

Example 3

This example illustrates the preparation of a preferred absorbent foam material by the claimed HIPE polymerization process including exfoliated sodium bentonite in the aqueous phase. The resulting foam has a bulk density of 27 mg/cc and a gram for gram absorption capacity under load (AUL @ 0.7 psi) of 40 grams of solution (aqueous and/or organic) per gram of foam.

To an organic solution comprising 1.55 parts sorbitan monooleate, 2.33 parts styrene, and 2.33 parts divinyl benzene, is added an aqueous solution comprising 245 parts water mixed in a blender with 0.12 parts exfoliated sodium bentonite for 20 minutes. Additionally, 1.7 parts polyacrylic acid solution (30% solids, MW=170,000, and 75% sodium salt), 0.5 parts potassium persulfate polymerization initiator, and 0.05 parts of a 1% ethylene glycol diglycidyl ether cross-linking agent solution are then added to the aqueous solution.

The aqueous solution is added to the organic solution at a rate of approximately 10 ml/min while stirring with a high shear mixing blade at 1000 rpm. After the addition of the aqueous solution is complete, stirring by high shear mixing continues at a rate of 2000 rpm for 5 minutes to introduce air into the thixotropic mixture, and to ensure complete mixing and small pore size.

The emulsion then is poured into a mold and cured at 60° C. for 16 hours. The resulting foam is obtained by removing it from its mold and drying it to a constant weight by heating it at 80° C. in a convection oven. The resulting foam has a density of 27 mg/cc and can imbibe 40 grams of fluid (aqueous and/or organic) for each gram of foam.

Example 4

This example illustrates the preparation of an absorbent foam material by the claimed HIPE polymerization process including the use of a high-molecular weight water-soluble polymer. The resulting foam has a bulk density of 23 mg/cc and a gram for gram absorption capacity under load (AUL @ 0.7 psi) of 48 grams of solution (aqueous and/or organic) per gram of foam.

To an organic solution comprising 1.55 parts sorbitan monooleate, 2.33 parts styrene, and 2.33 parts divinyl benzene, is added an aqueous solution comprising 245 parts water, 1.7 parts polyacrylic acid solution (30% solids, MW=440,000, and 75 mole percent neutralized to the sodium salt), 0.5 parts potassium persulfate polymerization initiator, and 0.05 parts of a 1% ethylene glycol diglycidyl ether cross-linking agent solution.

The aqueous solution is added to the organic solution at a rate of approximately 10 ml/min while stirring with a high shear mixing blade at 1000 rpm. After the addition of the aqueous solution is complete, stirring by high shear mixing continues at a rate of 2000 rpm for 5 minutes to introduce air into the thixotropic mixture, and to ensure complete mixing and small pore size.

The emulsion then is poured into a mold and cured at 60° C. for 16 hours. The resulting foam is obtained by removing the cured emulsion from its mold and drying it to a constant weight by heating it at 80° C. in a convection oven. The resulting foam has a density of 23 mg/cc and can imbibe 48 grams of fluid (aqueous and/or organic) for each gram of foam.

Example 5

This example illustrates the preparation of an absorbent foam material by the claimed HIPE polymerization process including a polyethylenimine as the water-soluble polymer in the aqueous phase. The resulting foam has a bulk density of 30 mg/cc and a gram for gram absorption capacity under no load (AUNL) of 27 grams of solution (aqueous and/or organic) per gram of foam.

To an organic solution comprising 1.55 parts sorbitan monooleate, 2.33 parts styrene, and 2.33 parts divinyl benzene, is added an aqueous solution comprising 245 parts water, 3 parts EPOMIN P1000 (30% solution of 70,000 MW polyethylenimine), 1.5 parts concentrated hydrochloric acid, and 0.5 parts Wako V-50 polymerization initiator.

The aqueous solution is added to the organic solution at a rate of approximately 10 ml/min while stirring with a high shear mixing blade at 1000 rpm. After the addition of the aqueous solution is complete, stirring by high shear mixing continues at a rate of 2000 rpm for 5 minutes to introduce air into the thixotropic mixture, and to ensure complete mixing and small pore size.

The emulsion then is poured into a mold and cured at 60° C. for 16 hours. The resulting foam is obtained by removing the cured emulsion from its mold and drying it to a constant weight by heating it at 80° C. in a convection oven. The resulting foam has a density of 30 mg/cc and can imbibe 27 grams of fluid (aqueous and/or organic) for each gram of foam.

Example 6

This example illustrates the preparation of an absorbent foam material by the preferred HIPE polymerization process which includes a poly(epicholorohydrin-alt-dimethylamine) as the water-soluble polymer in the aqueous phase. The resulting foam has a bulk density of 30 mg/cc and a gram for gram absorption capacity under no load (AUNL) of 30 grams of solution (aqueous and/or organic) per gram of foam.

To an organic solution comprising 1.55 parts sorbitan monooleate, 2.33 parts styrene, and 2.33 parts divinyl benzene, is added an aqueous solution comprising 245 parts water, 1.5 parts Agefloc A50-HV which is a poly (epichlorohydrin-alt-dimethylamine cross-linking agent solution available from CPS Chemical Company, and 0.5 parts Wako V-50 polymerization initiator.

The aqueous solution is added to the organic solution at a rate of approximately 10 ml/min while stirring with a high shear mixing blade at 1000 rpm. After the addition of the aqueous solution is complete, stirring by high shear mixing continues at a rate of 2000 rpm for 5 minutes to introduce air into the thixotropic mixture, and to ensure complete mixing and small pore size.

The emulsion then is poured into a mold and cured at 60° C. for 16 hours. The resulting foam is obtained by removing the cured emulsion from its mold and drying it to a constant weight by heating it at 80° C. in a convection oven. The resulting foam has a density of 30 mg/cc and can imbibe 30 grams of fluid (aqueous and/or organic) for each gram of foam.

Example 7

This example illustrates the preparation of an absorbent foam material by the claimed HIPE polymerization process including a dodecylpyrrolidone modified montmorrillonite clay in the organic phase. The resulting foam has a bulk density of 32 mg/cc and a gram for gram absorption capacity under no load (AUNL) of 35 grams of solution (aqueous and/or organic) per gram of foam.

To an organic suspension comprising 1.55 parts sorbitan monooleate, 2.33 parts styrene, and 2.33 parts divinyl benzene, and 0.2 parts of dodecylpyrrolidone modified montmorrillonite clay, is added an aqueous solution comprising 245 parts water, 1.7 parts polyacrylic acid solution (30% solids, MW=170,000, and 75 mole percent neutralized to the sodium salt), 0.5 parts potassium persulfate polymerization initiator, and 0.05 parts of a 1% ethylene glycol diglycidyl ether cross-linking agent solution.

The aqueous solution is added to the organic solution at a rate of approximately 10 ml/min while stirring with a high shear mixing blade at 1000 rpm. After the addition of the aqueous solution is complete, stirring by high shear mixing continues at a rate of 2000 rpm for 5 minutes to introduce air into the thixotropic mixture, and to ensure complete mixing and small pore size.

The emulsion then is poured into a mold and cured at 60° C. for 16 hours. The resulting foam is obtained by removing the cured emulsion from its mold and drying it to a constant weight by heating it at 80° C. in a convection oven. The resulting foam has a density of 32 mg/cc and can imbibe 35 grams of fluid (aqueous and/or organic) for each gram of foam.

Example 8

This example illustrates the preparation of a preferred absorbent foam material by the preferred HIPE polymerization process including the addition of a superabsorbent polymer (SAP) in a post-mixing, pre-cure step. The resulting foam has a bulk density of 15 mg/cc and a gram for gram absorption capacity under no load (AUNL) of 60 grams of solution (aqueous and/or organic) per gram of foam.

To an organic solution comprising 1.55 parts sorbitan monooleate, 2.33 parts styrene, and 2.33 parts divinyl benzene, is added an aqueous solution comprising 245 parts water, 1.7 parts polyacrylic acid solution (30% solids, MW=170,000, and 75 mole percent neutralized to the sodium salt), 0.5 parts potassium persulfate polymerization initiator, and 0.05 parts of a 1% ethylene glycol diglycidyl ether cross-linking agent solution.

The aqueous solution is added to the organic solution at a rate of approximately 10 ml/min while stirring with a high shear mixing blade at 1000 rpm. After the addition of the aqueous solution is complete, 1 gram of superabsorbent polymer (potassium salt, less than 212 micrometers ($\mu$m) particle size) swollen with 50 ml of DI water is added and then thoroughly mixed. Stirring by high shear mixing continues at a rate of 2000 rpm for 5 minutes to introduce air into the thixotropic mixture, and to ensure complete mixing and small pore size.

The emulsion then is poured into a mold and cured at 60° C. for 16 hours. The resulting foam is obtained by removing the cured emulsion from its mold and drying it to a constant weight by heating it at 80° C. in a convection oven. The resulting foam has a density of 15 mg/cc and can imbibe 60 grams of fluid (aqueous and/or organic) for each gram of foam.

Example 9

This example illustrates the preparation of another absorbent foam material by the claimed HIPE polymerization process including the addition of a superabsorbent fiber in a post-mixing, pre-cure step. The resulting foam has a bulk density of 27 mg/cc and a gram for gram absorption capacity under no load (AUNL) of 40 grams of solution (aqueous and/or organic) per gram of foam.

To an organic solution comprising 1.55 parts sorbitan monooleate, 2.33 parts styrene, and 2.33 parts divinyl benzene, is added an aqueous solution comprising 245 parts water, 1.7 parts polyacrylic acid solution (30% solids, MW=170,000, and 75 mole percent neutralized to the sodium salt), 0.5 parts potassium persulfate polymerization initiator, and 0.05 parts of a 1% ethylene glycol diglycidyl ether cross-linking agent solution.

The aqueous solution is added to the organic solution at a rate of approximately 10 ml/min while stirring with a high shear mixing blade at 1000 rpm. After the addition of the aqueous solution is complete, 1 gram of superabsorbent fiber (Camelot 7200M) swollen with 10 ml of DI water is added and then thoroughly mixed. Stirring by high shear mixing continues at a rate of 2000 rpm for 5 minutes to introduce air into the thixotropic mixture, and to ensure complete mixing and small pore size.

The emulsion then is poured into a mold and cured at 60° C. for 16 hours. The resulting foam is obtained by removing the cured emulsion from its mold and drying it to a constant weight by heating it at 80° C. in a convection oven. The resulting foam has a density of 27 mg/cc and can imbibe 40 grams of fluid (aqueous and/or organic) for each gram of foam.

Example 10

The following table provides the density (mg/cc) and the gram for gram absorption capacity under 0.7 psi load of various other hydrophilicly modified foams produced by the procedure described in Example 1.

|   | Water-Soluble Polymer (MW and % Neutralized) | Density (mg/cc) | AUL (g/g) |
|---|---|---|---|
| a. | Poly(N-Vinylpyrrolidone) (10,000 and 0%) | 24 | 22 |
| b. | Polyacrylic acid (2,000 and 70%) | 29 | 29 |
| c. | Polyacrylic acid (2,000 and 60%) | 31 | 26 |
| d. | Polyacrylic acid (2,000 and 40%) | 32 | 24 |
| e. | Polyacrylic acid (2,000 and 20%) | 29 | 15 |
| f. | Polyacrylic acid (240,000 and 80%) | 18 | 48 |
| g. | Polyacrylic acid (300,000 and 70%) | 16 | 53 |
| h. | Polyacrylic acid (450,000 and 70%) | 25 | 25 |
| i. | Polyacrylic acid (450,000 and 80%) | 28 | 25 |
| j. | Carboxymethyl Cellulose, Sodium Salt, (700,000 and 0%) | 23 | 38 |
| k. | Starch grafted sodium polyacrylate | 22 | 38 |
| l. | Poly(methylvinyl ether)-alt-maleic acid (70% neutralized) | 71 | 15 |
| m. | Polyacrylamide-co- 10% acrylic acid, Neutralized | 26 | 30 |

We claim:

1. A process for preparing a superabsorbent hydrophilic/oleophilic microcellular foam by high internal phase emulsion polymerization comprising the steps of:
    (a) dissolving an organic solvent-soluble surfactant in a water-insoluble monomer to form an organic phase;
    (b) blending the organic phase with an aqueous phase using high shear mixing to form an emulsion, said aqueous phase comprising, a water-soluble polymer and water;
    (c) polymerizing the water-insoluble monomer in the organic phase; and
    (d) final curing and drying the resulting foam.

2. The process of claim 1 further comprising the step of cross-linking the water-soluble polymer in the aqueous phase with a cross-linking agent.

3. The process of claim 1 further comprising the step of polymerizing a water-soluble monomer in the aqueous phase to form a water-soluble polymer.

4. The process of claim 3 further comprising the step of cross-linking the water-soluble polymer in the aqueous phase with a cross-linking agent to render the polymer water-insoluble and to form the water-insoluble polymer as an integral component of said foam.

5. The process of claim 1, wherein the weight ratio of said aqueous phase to said oil phase is in the range of about 3:1 to about 65:1.

6. The process of claim 5, wherein said water-soluble polymer is selected from the group consisting of: polyacrylic acid; polyacrylic acid neutralized to 5 to 95 mole percent; carboxymethylcellulose; hydroxyethyl cellulose; polyacrylamide; polyethylenimine; metal salts of polyethylenimine; poly(epichlorohydrin-alt-dimethylamine); copolymers of polyacrylamide, and acrylic acid; copolymers of poly(methyl vinyl ether) and maleic acid; poly(N-vinylpyrrolidone); starch; starch derivatives; and starch grafted sodium polyacrylate.

7. The process of claim 5, wherein said aqueous phase further comprises a water-soluble surfactant.

8. The process of claim 5, wherein said organic phase further comprises an organophilic clay.

9. The process of claim 8, wherein said organophilic clay is dodecylpyrrolidone montmorrillonite.

10. The process of claim 8, wherein said aqueous phase further includes an exfoliated sodium bentonite clay.

11. The process of claim 1, further comprising the step of blending a superabsorbent polymer with said organic and aqueous phases.

12. The process of claim 11, wherein the superabsorbent polymer is in the form of powder, granules or fibers.

* * * * *